United States Patent [19]

Postl

[11] Patent Number: 4,495,491
[45] Date of Patent: Jan. 22, 1985

[54] METHOD FOR HIGHLIGHTING OF A REGION ON A DISPLAY SCREEN

[75] Inventor: Wolfgang Postl, Berg, Fed. Rep. of Germany

[73] Assignee: Siemens Aktiengesellschaft, Berlin & Munich, Fed. Rep. of Germany

[21] Appl. No.: 561,125

[22] Filed: Dec. 13, 1983

Related U.S. Application Data

[63] Continuation of Ser. No. 191,680, Sep. 29, 1980, abandoned.

[30] Foreign Application Priority Data

Sep. 28, 1979 [DE] Fed. Rep. of Germany ....... 2939457

[51] Int. Cl.³ .............................................. G09G 1/16
[52] U.S. Cl. ................................... 340/709; 340/723; 340/730; 340/747
[58] Field of Search ............... 340/705, 709, 710, 723, 340/729, 730, 747, 793

[56] References Cited

U.S. PATENT DOCUMENTS

| | | | |
|---|---|---|---|
| 3,603,966 | 9/1971 | Gregg, Jr. ................. | 340/709 |
| 3,629,653 | 12/1971 | Irwin ........................ | 340/793 |
| 3,757,038 | 9/1973 | Jannery et al. ........... | 340/709 |
| 3,778,058 | 12/1973 | Rausch ..................... | 340/706 |
| 3,868,673 | 2/1975 | Mau, Jr. et al. .......... | 340/709 |
| 3,967,266 | 6/1976 | Roy .......................... | 340/709 |
| 4,126,814 | 11/1978 | Marlowe .................. | 340/793 |
| 4,158,200 | 6/1979 | Seitz et al. ............... | 340/793 |
| 4,212,008 | 7/1980 | Hopkins, Jr. ............. | 340/793 |
| 4,228,430 | 10/1980 | Iwamura et al. ......... | 340/709 |
| 4,297,691 | 10/1981 | Kodama et al. .......... | 340/703 |
| 4,345,313 | 8/1982 | Knox ........................ | 340/709 |

OTHER PUBLICATIONS

"Datamation;" Advertisement of Tektronix, Feb. 1979. p. S.129.

Primary Examiner—Marshall M. Curtis
Attorney, Agent, or Firm—Hill, Van Santen, Steadman & Simpson

[57] ABSTRACT

A method of highlighting a selective region of an image displayed on a display screen incorporates the steps of displaying the image normally during a first display phase, and modifying the image content within the region to be highlighted during a second display phase, and alternating the first and second display phases periodically, whereby the displayed image is displayed normally during the first display phase, and a selective region is highlighted during the second display phase.

10 Claims, 9 Drawing Figures

METHOD FOR HIGHLIGHTING OF A REGION ON A DISPLAY SCREEN

This application is a continuation of application Ser. No. 191,680, filed 9/29/80 now abandoned.

BACKGROUND

1. Field of the Invention

The present invention relates to a method for highlighting a region of an image displayed on a display screen, particularly when such display screen displays individually selected image elements in two levels of brightness.

2. The Prior Art

It is frequently desirable to mark a region of an image appearing on a display screen, or a text of a character appearing thereon, in order to designate the boundaries of a region which is to be manipulated in some manner. The manipulation may involve text processing or editing, for example, or may involve the erasure, displacement, enlargement, reduction or copying of specific regions.

In the past, it has been known to mark a position such as may be occupied by a character of text, with a periodic change of brightness, so that the position of the character is emphasized. In graphics picture screens, such as the Tektronix 4014 Memory Picture Screen, the position of a specific point may be identified by a graticule. In the Tektronix 4016-1, a point may be indicated by the lower left corner of the lighted rectangular region. Both of these highlighting methods have the disadvantage that part of the image is obliterated, or sometimes the graticule or the rectangle is rendered invisible, depending on the character of the image being displayed.

BRIEF DESCRIPTION OF THE INVENTION

It is a principal object of the present invention to provide a method for highlighting an image region within a displayed image made up of individually targetable image elements, in which the highlighting can be readily seen in contrast to the displayed image, and by which the recognizability of the image is not obscured by the highlighting.

This object is achieved by means of a method for highlighting an image region by which, during the first display phase, the image content within that region is displayed without change, and in another display phase, the image content is displayed differently, with the two phases periodically repeated in alternation. This method offers the advantage that a clear highlighting of the image region is provided while retaining a clear recognizability of the content of the displayed image.

Apparatus which can perform the functions of the invention is well known in the art, i.e. any device may be used which allows for highlighting and/or darkening a selected subset of image dots of a display, the manner of selection going to be described by the invention. A class of such devices is described in "DISPLAYS" April 1980, pp. 16 to 28, a useful configuration by FIG. 12 on page 21 of this journal.

These and other objects and advantages of the present invention will become manifest by a review of the following description and accompanying drawings.

BRIEF DESCRIPTION OF THE DRAWINGS

Reference will now be made to the accompanying drawings in which.

DESCRIPTION OF THE PREFERRED EMBODIMENTS

Figure 1:
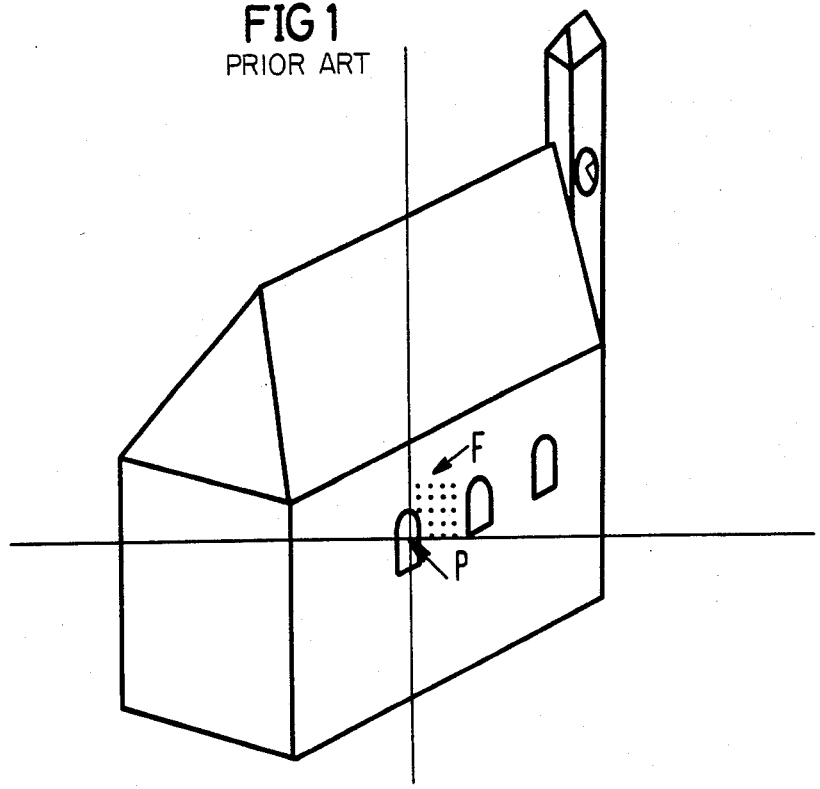
FIG. 1 is an illustration of a prior art means of emphasis used in connection with the displayed image.

FIG. 1 illustrates a picture image appearing on a display screen, with a point on the image indicated both by a graticule and by a brightened rectangular region. The displayed image is made up of a plurality of points P which are closely connected and which simulate, for example, lines. The graticule super-imposed on the image as shown in FIG. 1 tends to obscure part of the image, and when part of the graticule is aligned with a line making up part of the image, part of the graticule disappears. In a worst case condition, the graticule may disappear altogether.

When a rectangular portion F of the display screen is brightened, it tends to obscure details of the displayed image, and may also be invisible, if the brightness of the image at that point is also high. FIG. 1 therefore illustrates the disadvantages of the methods employed in the past.

Figure 2:
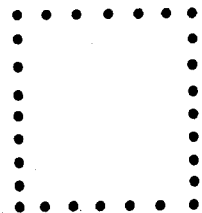
FIG. 2 is a schematic illustration of a region which is to be emphasized, defined by a plurality of points.
Figure 3:
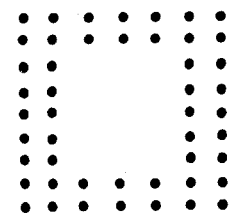
FIG. 3 illustrates another manner of marking the boundaries of an image field.

In FIG. 2, the boundaries of an image area which is to be emphasized are shown in a rectangular form, made of a series of dots or points. FIG. 3 shows an alternative boundary, which is defined by two rectangles, one inside the other.

Through the present invention, the regularly displayed image within the boundary is displayed normally, during one period of time, and with modified brightness at another period of time. These two periods are alternated, so that part of the time the image appears normally, but the position of the part of the image which is highlighted is emphasized by periodic changes in brightness. By this means, no details of the displayed image are lost, nor is the emphasis swamped out by the character of the image.

Figure 4:
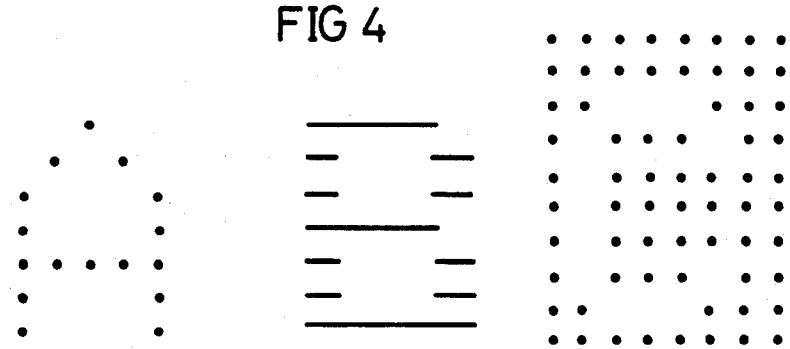
FIG. 4 is a schematic illustration of text characters consisting of individually targetable image elements.

FIG. 4 illustrates three text characters A, B and C, displayed respectively in different manners of display. A and C are illustrated as image elements made up of a series of dots, in which each dot represents an illuminated image element. The letter A is illustrated in normal form, the letter C is illustrated in complementary form. The letter B is illustrated as being made up of image elements in the form of a series of horizontal lines, such as is common in connection with normal television picture screens.

Figure 5:
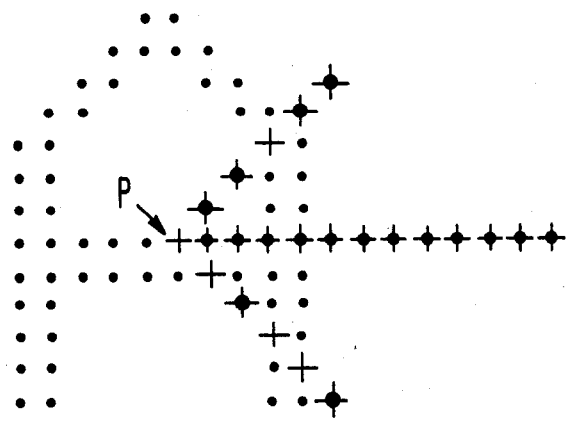
FIG. 5 is a schematic illustration of an example of a cursor display incorporating the present invention.

FIG. 5 illustrates a cursor display incorporating the present invention, in which the cursor is indicated by an arrow pointing leftwardly, made up of a series of dots representing illuminated points. The cursor marks the point P. By use of the present invention, part of the time the image appears normally (without the cursor), and while the cursor is displayed at alternate times, the points of the image area which correspond with points of the cursor are altered. As an example, the intensity at these points is complemented, that is, a bright point becomes a dark point and vice versa. By alternating the complementary representation of these image points, with the normal appearance of the displayed image, the cursor becomes clearly visible. Preferably, this alteration takes place with a period of about a half a second.

Figure 6:
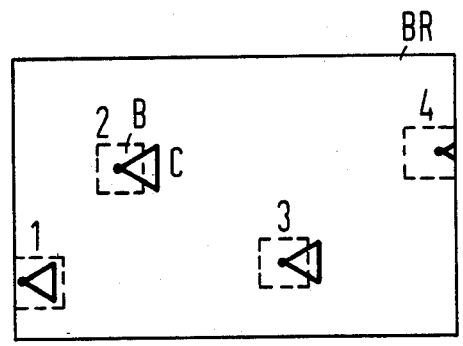
FIG. 6 is a schematic illustration showing a cursor appearing at various points during the field of a display screen.

Referring now to FIG. 6, the appearance of a triangular cursor is shown at different parts of the display screen. At position 1, the cursor is near the left-hand edge of the display screen BR. In positions 2 and 3, the cursor is in the intermediate part of the display screen, whereas at position 4, it is near the right-hand edge. The cursor C is shown in a triangular configuration, with the area of the picture appearing on the display screen designated B. Although shown in triangular form in FIG. 6, the cursor may, of course, be the arrow shape as illustrated in FIG. 5.

In a display screen which has only two levels of brightness, namely, illuminated and non-illuminated, complementation of the brightness value consists of converting the brightness of each point from the darker into the lighter or vice versa. When the display screen allows the display of brightness values at a plurality of levels, complementation of the brightness can take place by the means of interchanging of two levels of brightness lying above and below (that is, brighter and darker) symmetrically with respect to a mean level of brightness.

In another embodiment of the present invention, the brightness values of the image elements in the region to be emphasized are subjected to a linear transformation, with parameters which can be set by the operator. This can be expressed by the mathematical equation:

$$Y = A \times X + B$$

where X is the original brightness value, Y is the new or changed brightness value, and A and B are parameters of the transformation which may be set by the operator. It can be seen that this equation transforms an original brightness A to a new level Y, by adding a set increase in brightness B, and multiplying the original brightness value by the parameter A. When the parameter A is between 0 and 1, the changed brightness value may be less than the original brightness value. For display screens in which the brightness value cannot be displayed continuously, but only in three or four discrete stages, the linear transformation is only approximated by the above equation.

In another embodiment of the present invention, the relative brightness of the individual image elements are switched from normal to bright intensity within a second display phase 2, and are switched from normal to dark during a third display phase 3. If the normal picture is represented by display phase 1, the order of the three phases can alternate in the sequence 1-2-1-3-1-2-1-3 .... The duration of the three phase 1, 2 and 3 may each be adjustable, independently of one another, in accordance with the desired result.

In another embodiment of the present invention, the manner of display may be changed over from the highlighting methods first described, namely, those relating to the exchange of brightness values, and the highlighting methods most recently described, namely, those in which bright and dark display phases occur in sequence with the normal picture representation. This changeover can take place automatically, by being programmed to do so. Alternatively, the change-over may take place under the manual control of an operator.

In a further embodiment of the present invention, a determination of the overall brightness of the reference field to be highlighted is made, and the form in which the highlighting takes place may be selected automatically in response to the mean brightness in the region to be emphasized. The determination of the mean brightness may be made after each change in the position, size or shape of the image region, so that the highlighting mode selected at any given time is the one which corresponds to the mean brightness of the region desired to be emphasized at any given time. The overall brightness may be calculated by adding individual brightness values for each of the individual image elements in the reference field.

For example, when only two levels of brightness are possible, for example, 0 and 1 representing dark and bright conditions of an image element, the mean brightness can be calculated by counting the number of image elements at brightness 1, and dividing by the total number of image elements. If this mean value is greater than a value $Z_1$, a first mode of emphasis is selected. Otherwise, a different mode is selected. Alternatively, if the mean brightness value is less than the parameter $Z_2$, one or another of two display modes may be chosen. The values $Z_1$ and $Z_2$ may be subjectively set by the operator to achieve the desired emphasis at different levels of mean intensity of the picture. Alternatively, the parameters $Z_1$ and $Z_2$ may be calculated by a function generator provided for that purpose, whereby a function $F_1$ is determined as the function of the independent variables Z and $Q_1$, where Z is the mean value of the brightness of the region to be emphasized, and a second parameter $F_2$ may be calculated as a function of independent variables Z and $Q_2$. $Q_1$ and $Q_2$ may be parameters which are settable in accordance with the desires of the operator, whereby the parameters $Z_1$ and $Z_2$ are indirectly related to the adjustable parameters $Q_1$ and $Q_2$.

In one embodiment, $Z_1$ is equal to $Z \times Q_1$, and $Z_2$ is equal to $Z \times Q_2$, where the parameters $Q_1$ and $Q_2$ are real numbers between 0 and 1.

When the intensity of the picture elements is modified periodically by means of the present invention within a specified region, that modification may take the place of a cursor, so that a separate cursor, independent of the picture elements, is not needed to locate or emphasize the selected region.

In another embodiment of the present invention, a portion of the image region which has the form of a curve is modified periodically for emphasis. The curve is identified by two points, of which one point indicates the location to be marked or emphasized, as by a cursor, with the other point being retained at its original position, whereby the shape of the curve, in the image region to be highlighted, is changed. Preferably, this change takes place in accordance with a linear transformation which may be described by the following equations:

$$X2 = A11 \times X1 + A12 \times Y1$$

$$Y2 = A21 \times X1 + A22 \times Y1$$

where X1 and Y1 indicate the original coordinates of the point to be changed, and X2 and Y2 are the changed coordinates. A11, A12, A21 and A22 are parameters of the transformation which may be independently set by the operator as described. In the case of display screens which employ a discrete matrix or raster, the relationships according to the above equations are only approximate.

In one advantageous embodiment of the invention, the region to be emphasized is rectangular, in which two opposite corners of the rectangle correspond to the two points referred to above, namely, the point identifying the image location being marked by the cursor, and the other point being unchanged in its position. By this means, the specific location on the display screen of each part of the image within such rectangle, is alternately changed and unchanged in its position, in accordance with the above equations, to emphasize that region.

Figure 7:
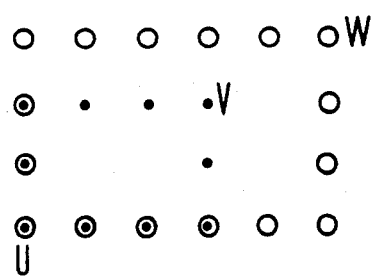
FIG. 7 illustrates an alternative form of the present invention.

Referring now to FIG. 7, an example of this embodiment is illustrated. FIG. 7 illustrates a cursor in two different positions, corresponding to the unmodified picture image, and the picture image which is modified by having shifted picture elements. The point U is the point which does not change in position, whereas the points V and W mark the two different cursor positions. The image elements which are contained within the image region corresponding to the first cursor position are illustrated by points, and those contained in the image region corresponding to the second cursor position are illustrated by circles. It can be seen from FIG. 7 that the cursor alternately changes from a relatively small rectangle with diagonal UV, to a larger rectangle with diagonal UW. The larger and smaller rectangles are displayed alternately, so that the cursor pulses in size in order to emphasize that portion of the image being displayed.

Figure 8:
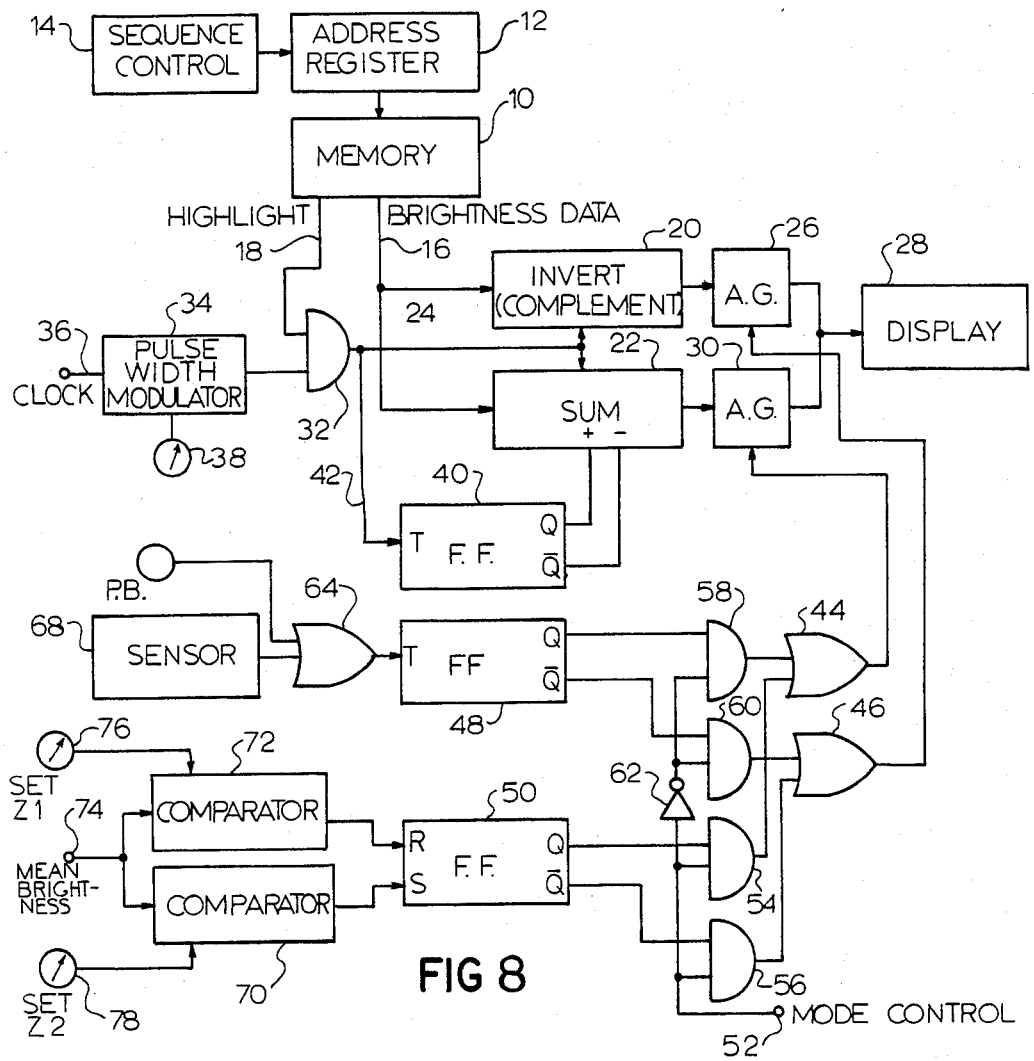
FIG. 8 is a functional block diagram of one embodiment of the apparatus for carrying out the present invention.

Reference will now be made to FIG. 8 which shows a functional block diagram of one embodiment for carrying out the present invention. In a system of FIG. 8, the brightness data for a plurality of points to be displayed is stored in a memory unit 10, which is addressed by an address register 12 controlled by a sequence control unit 14. Each storage location of the memory 10 stores data corresponding to the brightness of the display at that point, and an indication of whether or not that point is to be highlighted. This data is produced on line 16 and 18 respectively.

Line 16, which carries the brightness data, is connected to inputs respectively of an invert unit 20 and a summing unit 22, both of which are controlled by a signal on a control line 24. When the signal on the control line 24 has one polarity, the brightness data passes through the invert unit 20 in unchanged condition, and also passes through the summation unit 22 in unchanged condition. The output of the invert unit 20 is connected through an analog gate 26 to the input of the display device 28, and the output of the summation unit 22 passes through analog gate 30 to the input of the display unit 28. Only one of the analog gates 26 and 30 is enabled at any given time.

The control signal on line 24 is produced by the output of an AND gate 32 which receives one input from line 18 and another input from a pulse width modulator 34 which modulates the duty factor of a clock signal applied to a terminal 36, in accordance with a manual control 38.

In operation, when the signal on line 18 indicates that data is not to be highlighted, the potential on the control line 24 is low, and brightness data is transmitted in unaltered fashion through the inverter unit 20 and the analog gate 26 to the display unit 28. When the signal on line 18 indicates that the data is to be highlighted, it is alternately passed in unmodified condition and in inverted condition, as the potential on the control line 24 changes its magnitude, as a result of a the modified clock signal produced by the pulse width modulator 34. The control 38 regulates the relative time of the positive-going and negative-going outputs of the modulator unit 34. By substituting a variable frequency oscillator for the clock signals applied to the terminal 36, both of the half cycles of the output of the unit 34 may be independently controlled.

When the analog gate 30 is operative, the brightness data on the line 16 passes through the summation circuit 22 unchanged, as long the potential on the line 24 is low. When the potential on line 24 is high, the brightness data is modified by being increased or decreased in brightness, in accordance with the condition of the flip flop 40, the Q and $\overline{Q}$ output of which are connected to modifying inputs of the summation unit 22. The line 24 is connected to a toggle input of the flip-flop 40, in order to switch its condition for each cycle of the control signal. Accordingly, during alternate periods in which the brightness is modified by the summation unit 22, it is made alternately brighter and darker, in accordance with the changing condition of the flip-flop 40. The modified output of the summation unit 22 passes through the analog gate 30 to the display unit 28.

One of the analog gates 26 and 30 is selected for operation by a circuit which includes a pair of OR gates 44 and 46. The OR gates 44 and 46 pass outputs from one of a pair of flip-flops 48 and 50, depending on a mode control signal applied to a terminal 52. A pair of AND gates 54 and 56 have one input connected to the terminal 52, and their other terminal connected to the Q and $\overline{Q}$ outputs of the flip-flop 50, and a second pair of AND gates 58 and 60 have one input connected through an inverter 62 to the terminal 52 and their other inputs connected to the Q and $\overline{Q}$ outputs of the flip-flop 48 respectively.

When the mode control signal in the terminal 52 is low, the flip-flop 48 has control. Each condition is toggled by an input received from an OR gate 64. One input of the OR gate is connected to a push button 66, by which an operator may toggle the condition of the flip-flop 48 when ever desired. The other input of the flip-flop 64 is connected to a sensor 68, which is adapted to sense any desired condition and toggle the flip-flop 48 accordingly. The sensor 68 may respond, for example to the overall brightness of the image being displayed on the display unit 28.

When the mode control signal applied to the terminal 52 is high, the flip-flop 50 receives control. The flip-flop 50 has a set input connected to the output of a comparator 70, and a reset input connected to the output of a comparator 72. The comparator 72 has one input connected to a terminal 74 to which is applied a signal representative of the mean brightness of the image being displayed on the display unit 28, while the other input of the comparator 72 is connected to a manual control 76 which sets the parameter $Z_1$. Accordingly, the flip-flop 50 is reset when the mean brightness exceeds the parameter $Z_1$. In like fashion, the comparator 70 has one input connected to the terminal 74 and another terminal connected to a manual control 78 which sets parameter $Z_2$. Accordingly, the flip-flop 50 is set when the mean brightness falls below the parameter $Z_2$. Thus, when the mode control signal is high, one or other of the analog gates 26 and 30 is made operative depending on the relationship between the mean brightness and the manually adjustable parameter $Z_1$ and $Z_2$.

Figure 9:
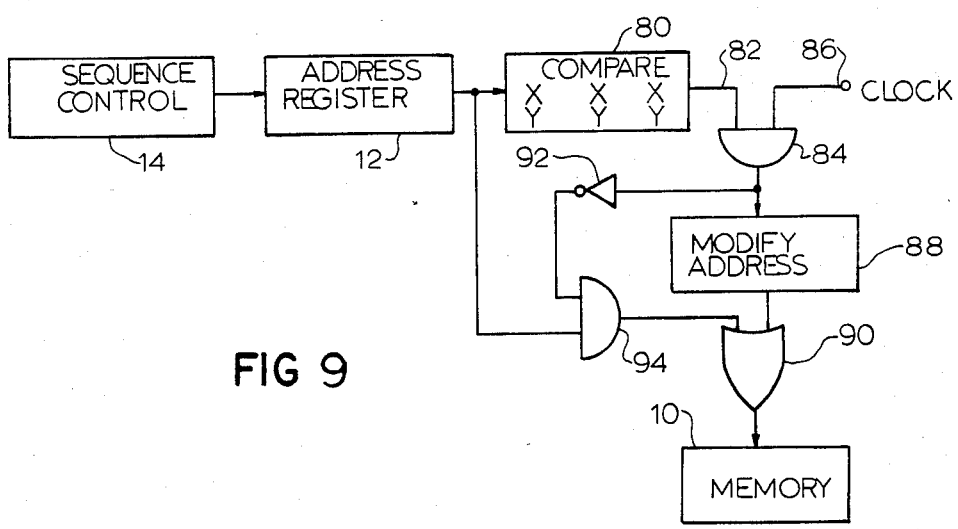
FIG. 9 is a functional block diagram of another embodiment of the present invention.

In FIG. 9, a functional block diagram is illustrated of apparatus for carrying out the method illustrated in FIG. 7. In the arrangement of FIG. 9, the output of the address register 12 is connected to a comparator unit 80, which compares the coordinates of the display representated by the output of the address register with the points X1 Y1, and X2 Y2, representing the opposite ends of the diagonal of a rectangle, the interior of which is to be highlighted. The point X1 Y1 is for example closest of the origin, and the point X2 Y2 is furthest away from the origin.

When the address of the address register is found by the comparator unit 80 to be within the rectangle to be highlighted, a signal is produced on a line 82 which is connected to one input of an AND gate 84. The other input of the AND gate 84 is connected to a clock signal at a terminal 86, and the output of the AND gate 84 is connected to the input of a unit 88 which modifies the address which is being output by the address register 12. The modified address is then connected to the memory 10 through an OR gate 90.

The output of the AND gate 84 is connected through an inverter 92 to the input of another and gate 94, which receives a second input from the address register 12. Thus when the output of the AND gate 84 is low, the AND gate 94 is operative to connect the unmodified address from the address register 12 through the OR gate 90 to the memory unit 10.

In operation, brightness data from storage locations which are not within the rectangle to be emphasized are connected directly to the memory through the gates 94 and 90. Within the emphasized rectangle, unmodified addresses are connected to the memory 10 when the clock signal at the terminal 86 is low, but at other times a modified address is connected to the memory 10. Because of the modification of the address, brightness data corresponding to a different part of the normal display is displayed at each point within the rectangle to be emphasized, resulting in an apparent change of position as described in connection with FIG. 7.

It is apparent that various modifications and additions may be made in the present invention without departing from the essential features of novelty thereof, which are intended to be defined and secured by the appended claims.

What is claimed is:

1. A method of highlighting an image region within an image composed of image elements displayed on a display screen which can display said image elements in at least two levels of brightness, each said image element being individually targetable in positional relation to said image region comprising the steps of changing-over between a first mode of high-lighting and a second mode of highlighting, wherein said first mode comprises alternately displaying the image elements of the region to be emphasized in changed and unchanged condition, modifying the image content within the region to be highlighted during said changed condition, and wherein said second mode comprises alternately displaying the image elements of the region to be emphasized in changed and a different unchanged condition, and modifying the image content within the region to be highlighted during said changed condition of said second mode differently from that in said first mode, and effecting said changing-over automatically in response to a predetermined condition of said image content.

2. The method according to claim 1, including the step of effecting said change-over under manual control of an operator.

3. The method according to claim 1, including the steps of determining the overall brightness of a reference field juxtaposed with the image region to be highlighted, and selecting said first or second highlighting modes in response to said brightness.

4. The method according to claim 3, including the step of selecting a first mode of highlighting when the mean brightness is greater than a parameter $Z_1$ and selecting a second mode of highlighting when the mean brightness is less than the parameter $Z_2$.

5. The method according to claim 4, including the step of adjusting the values of the parameters $Z_1$ and $Z_2$.

6. The method according to claim 1, wherein the three display phases alternate in the sequence 1-2-1-3-1-2-1, where 1 indicates the normal image content and 2 and 3 indicate two different variations from normal in image content.

7. A method of highlighting an image region within an image made of individually targetable image elements displayed on a display screen which can display the image elements in at least two levels of brightness, comprising the steps of displaying the image within a selected region without change during a first display phase, and modifying the image content within the region to be highlighted during a second display phase, alternating said first and second display phases periodically, and changing between a first mode of highlighting to a second mode of highlighting, said first mode comprising alternately displaying the image elements of the region to be emphasized in changed and unchanged condition, said second mode comprising three alternating display phases in which one display phase presents said region in unchanged form, the second phase presents it with increased brightness, and the third phase presents it with reduced brightness, determining the overall brightness of a reference field juxtaposed with the image region to be highlighted and selecting said first or second highlighting mode in response to said brightness, said first mode being selected when the mean brightness is greater than a parameter $Z_1$ and said second mode of highlighting means selected when the mean brightness is less than the parameter $Z_2$, and calculating the parameters $Z_1$ and $Z_2$ by means of a function generator as a function of the independent values $Z$ and $Q_1$ and $Z$ and $Q_2$, respectively, where $Z$ is the mean brightness, and $Q_1$ and $Q_2$ are selectively adjustable parameters.

8. A method of highlighting an image region within an image made of individually targetable image elements displayed on a display screen which can display the image elements with at least two levels of brightness comprising the steps of displaying the image within a selected region without change during a first display phase, modifying the image content within the region to be highlighted during a second display phase, and alternating said first and second display phases periodically, the region highlighted within said image having the form of a curve containing first and second points, said first point indicating the image location to be marked by said image region and said second point being displayed in its normal position, and changing the location of said first point periodically, whereby the shape of the curve changes in accordance with a linear transformation.

9. The method according to claim 7, including the step of calculating $Z_1$ as the product of $Z$ and $Q_1$, and calculating $Z_2$ as the product of $Z$ and $Q_2$, where the parameters $Q_1$ and $Q_2$ are real numbers between 0 and 1.

10. The method according to claim 8, wherein said first and second points define opposite ends of the diagonal of a rectangle, and wherein the position of said first point is periodically changed in accordance with previously determined parameters.

* * * * *